United States Patent
Holmdahl et al.

(12)

(10) Patent No.: US 9,015,746 B2
(45) Date of Patent: Apr. 21, 2015

(54) INTEREST-BASED VIDEO STREAMS

(75) Inventors: Todd Eric Holmdahl, Redmond, WA (US); David Rogers Treadwell, III, Seattle, WA (US); Doug Burger, Bellevue, WA (US); James A. Baldwin, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/163,522

(22) Filed: Jun. 17, 2011

(65) Prior Publication Data

US 2012/0324493 A1    Dec. 20, 2012

(51) Int. Cl.
| | |
|---|---|
| *H04H 60/33* | (2008.01) |
| *H04H 60/32* | (2008.01) |
| *H04N 7/173* | (2011.01) |
| *H04N 7/10* | (2006.01) |
| *H04N 7/025* | (2006.01) |
| *H04N 5/445* | (2011.01) |
| *G06F 3/00* | (2006.01) |
| *G06F 13/00* | (2006.01) |
| *H04N 21/25* | (2011.01) |
| *H04N 21/2668* | (2011.01) |
| *H04N 21/422* | (2011.01) |
| *H04N 21/442* | (2011.01) |
| *H04N 21/658* | (2011.01) |
| *H04H 60/45* | (2008.01) |

(52) U.S. Cl.
CPC ............ *H04H 60/33* (2013.01); *H04N 21/252* (2013.01); *H04N 21/2668* (2013.01); *H04N 21/42201* (2013.01); *H04N 21/42202* (2013.01); *H04N 21/44213* (2013.01); *H04N 21/6582* (2013.01); *H04H 60/45* (2013.01)

(58) Field of Classification Search
USPC .......................................................... 725/10
See application file for complete search history.

(56) References Cited

U.S. PATENT DOCUMENTS

| | | |
|---|---|---|
| 4,931,865 A | 6/1990 | Scarampi |
| 5,319,455 A | 6/1994 | Hoarty et al. |
| 7,023,499 B2 | 4/2006 | Williams et al. |
| 7,260,823 B2 | 8/2007 | Schlack et al. |
| 7,370,342 B2 | 5/2008 | Ismail et al. |
| 7,631,327 B2 | 12/2009 | Dempski et al. |
| 7,698,302 B2 | 4/2010 | Wendelrup |
| 2003/0028889 A1 | 2/2003 | McCoskey et al. |

(Continued)

OTHER PUBLICATIONS

"How Viewers Engage With Television", Retrieved at <<http://www.thinkbox.tv/server/show/nav.854>>, Retrieved Date: Mar. 10, 2011, p. 1.

(Continued)

*Primary Examiner* — Justin Shepard
(74) *Attorney, Agent, or Firm* — Nicholas Chen; Kate Drakos; Micky Minhas (57) ABSTRACT

Embodiments related to delivering a video stream to a requesting viewer are disclosed. In one example embodiment, a video stream is delivered by receiving a request for the video stream from a requesting device, the request including the requesting viewer's identity, assembling a list of selected video content items for display to the requesting viewer, the selected video items being selected from a plurality of video items based on the identity of the requesting viewer and a viewing interest profile comprising the requesting viewer's viewing interests, and sending the video stream for display, the video stream including one or more of the selected video items.

18 Claims, 4 Drawing Sheets

(56) References Cited

U.S. PATENT DOCUMENTS

| | | | |
|---|---|---|---|
| 2003/0093784 A1* | 5/2003 | Dimitrova et al. | 725/10 |
| 2004/0004599 A1 | 1/2004 | Shepard et al. | |
| 2005/0071865 A1 | 3/2005 | Martins | |
| 2005/0120391 A1 | 6/2005 | Haynie et al. | |
| 2005/0132420 A1 | 6/2005 | Howard et al. | |
| 2006/0161952 A1* | 7/2006 | Herz et al. | 725/46 |
| 2008/0034393 A1 | 2/2008 | Crayford | |
| 2008/0086742 A1 | 4/2008 | Aldrey et al. | |
| 2008/0109843 A1* | 5/2008 | Ullah | 725/34 |
| 2008/0133638 A1 | 6/2008 | Fischer et al. | |
| 2008/0147488 A1 | 6/2008 | Tunick et al. | |
| 2008/0244655 A1 | 10/2008 | Mattila et al. | |
| 2009/0019488 A1 | 1/2009 | Ruiz-Velasco et al. | |
| 2009/0089833 A1 | 4/2009 | Saito et al. | |
| 2009/0113480 A1 | 4/2009 | Allard et al. | |
| 2009/0195392 A1 | 8/2009 | Zalewski | |
| 2009/0210902 A1 | 8/2009 | Slaney et al. | |
| 2009/0217315 A1 | 8/2009 | Malik et al. | |
| 2009/0217324 A1 | 8/2009 | Massimi | |
| 2009/0293079 A1 | 11/2009 | McKee et al. | |
| 2010/0037277 A1 | 2/2010 | Flynn-Ripley et al. | |
| 2010/0070987 A1 | 3/2010 | Amento et al. | |
| 2010/0086204 A1 | 4/2010 | Lessing | |
| 2010/0150530 A1 | 6/2010 | Zalewski | |
| 2010/0186041 A1 | 7/2010 | Chu et al. | |
| 2010/0205628 A1* | 8/2010 | Davis et al. | 725/25 |
| 2010/0211439 A1 | 8/2010 | Marci et al. | |
| 2010/0251304 A1* | 9/2010 | Donoghue et al. | 725/46 |
| 2010/0293565 A1 | 11/2010 | Rantalainen | |
| 2011/0099263 A1 | 4/2011 | Patil et al. | |
| 2012/0072939 A1* | 3/2012 | Crenshaw | 725/12 |
| 2012/0084136 A1* | 4/2012 | Seth et al. | 705/14.39 |

OTHER PUBLICATIONS

Lekakos, et al., "An Integrated Approach to Interactive and Personalized TV Advertising", Retrieved at <<http://citeseerx.ist.psu.edu/viewdoc/download?doi=10.1.1.129.2265&rep=rep1&type=pdf>>, In Workshop on Personalization in Future TV, 2001, pp. 1-10.

Kastelein, Richard, "Social TV: How Facebook, Twitter and Connected TV Will Transform the TV Market", Retrieved at <<http://www.appmarket.tv/news/160-breaking-news/455-social-tv-how-facebook-twitter-and-connected-tv-will-transform-the-tv-market.html>>, Jul. 4, 2010, pp. 4.

Harrison, et al., "CollaboraTV—Making TV Social Again", Retrieved at <<https://soc.kuleuven.be/com/mediac/socialitv/CollaboraTV%20-%20Making%20TV%20Social%20Again.pdf>>, Retrieved Date: Mar. 14, 2011, pp. 2.

"Social Media Meets Online Television: Social TV Brings Television 2.0 to Your TV Set", Retrieved at <<http://www.masternewmedia.org/social-media-meets-online-television-social-tv-brings-television-20-to-your-tv-set/>>, Jan. 27, 2010, pp. 15.

"Real-Time Television Content Platform", Retrieved at <<http://www.accenture.com/us-en/pages/insight-real-time-television-platform.aspx>>, May 28, 2002, pp. 3.

Vidyarthi, Neil, "Report Facebook and Twitter Battle for Social TV Ad Space", Retrieved at <<http://www.socialtimes.com/2010/07/report-facebook-and-twitter-battle-for-social-tv-ad-space/>>, Jul. 6, 2010, pp. 5.

Wong, George, "TV Video Sensor Used to Provide Selective Advertising", Retrieved at <<http://www.ubergizmo.com/2011/03/tv-video-sensor-selective-advertising/>>, Mar. 2, 2011, pp. 3.

Smith, Tony, "Toshiba Previews TV UI for Cloud Content", Retrieved at <<http://www.reghardware.com/2011/02/15/toshiba$_{13}$previews_places/>>, Feb. 15, 2011, pp. 3.

"International Search Report", Mailed Date: Dec. 20, 2012, Application No. PCT/US2012/042650, Filed Date: Jun. 15, 2012, pp. 9.

European Patent Office, Extended European Search Report Issued in Application No. 12800876.0, Oct. 23, 2014, 8 pages.

\* cited by examiner

INTEREST-BASED VIDEO STREAMS

BACKGROUND

Video content may be obtained from a continually growing number of content sources via a diverse set of communications mediums. For example, digital cable television and/or satellite television may enable the broadcast of hundreds of channels of content. Likewise, video may be provided over a computer network via a potentially unlimited number of sources. As a result, a viewer may find it increasingly challenging to discover interesting and relevant content.

SUMMARY

Various embodiments are disclosed herein that relate to delivering a video stream to a requesting viewer. For example, one embodiment provides a method of providing video content comprising receiving a request for the video stream from a requesting device, the request including the requesting viewer's identity. A list of selected video content items is then assembled for display to the requesting viewer, the selected video items being selected from a plurality of video items based on the identity of the requesting viewer and a viewing interest profile comprising a representation of the requesting viewer's viewing interests. A video stream comprising one or more of the selected video content items is then sent for display to the requesting viewer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Broadcast television has long been a one-to-many channel, pushing out programming to a large number of viewers without providing a real-time feedback loop for viewer feedback. This model made customization and provision of video streams on a per-viewer basis difficult. As a result, the opportunities for viewers to view desired programming were limited to the pre-scheduled programming on available channels.

More recently, video recording devices and an expansion in the channels though which content may be accessed has facilitated the ability of users to watch desired content on a desired schedule. For example, if two desired television shows are broadcast at the same time, a user may record one while watching the other, and then view the recorded show at a later time.

Likewise, the user also may access the other show at a later time by streaming video from a website of the content provider. The development of streaming video delivery via a network has greatly increased the number of content sources available, and also allows users to access programming at any desired time, rather than being limited by broadcast time. Additionally, digital cable, broadcast and satellite television has greatly increased a number of channels available for viewing.

However, such factors have also made content discovery challenging. For example, as mentioned above, digital and satellite television may provide hundreds of available channels. Further, many online sources of content have extremely large content collections. While a user may locate digital or satellite content via an electronic programming guide, discovery of online content may be much more difficult. For example, search engines may have difficulty locating specific content on an unaffiliated video content provision website. Therefore, viewers wishing to discover such content may resort to performing searching on each individual video content site.

In light of such issues, the disclosed embodiments utilize the detection of various attributes of a user, including but not limited to emotional state and social network connections, to discover potentially interesting video content for the user. The disclosed embodiments further relate to entertainment systems including viewing environment sensors to assist in determining viewer preferences for use in helping viewers to discover content.

In some embodiments, selection of video items also may be based on the emotional responses of other viewers to those video items, as well as on the viewing interests of the requesting viewer. Further, video selections may be customized based on other factors, such as a time of day when the video stream is to be presented to the requesting viewer, a geographic location selected by the requesting viewer, the requesting viewer's social network(s), and Internet browsing interests of the requesting viewer.

Examples of viewing environment sensors that may be used to gather data for use in sensing emotional state include, but are not limited to, image sensors, depth sensors, acoustic sensors, and potentially other sensors such as motion and biometric sensors. Such sensors may allow systems to identify individuals, detect and understand human emotional expressions, and provide real-time feedback while a viewer is watching video. Based on such feedback, an entertainment system may determine a measure of a viewer's enjoyment of the video item and provide real-time responses to the perceived viewer emotional responses. Further, emotional responses of viewers to video items may be aggregated and fed to content creators.

Figure 1:
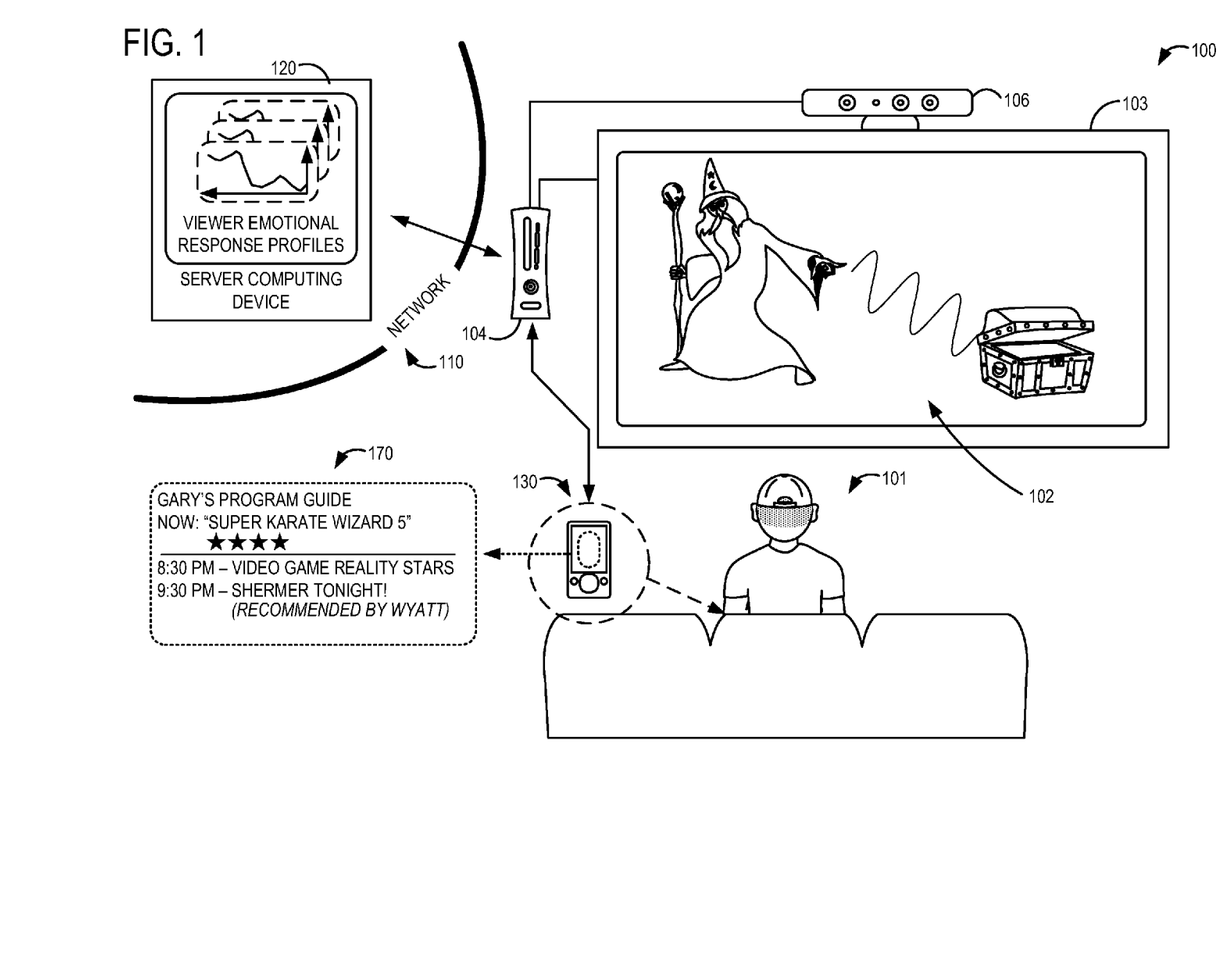
FIG. 1 schematically shows a viewer watching a video stream within a video viewing environment according to an embodiment of the present disclosure.

FIG. 1 schematically shows an embodiment of a video viewing environment 100 in which a viewer 101 is viewing a video item 102 on a display device 103. Display of the video items may be controlled by computing devices, such as media computing device 104, or may be controlled in any other suitable manner. The media computing device 104 may comprise a game console, a set-top box, a desktop computer, laptop computer, notepad computer, or any other suitable computing device, and comprises a display output configured to output data to display device 103 for display An embodiment of a video viewing environment sensor system 106 is shown connected to media computing device 104 via a peripheral input at which the media computing device receives sensor data to media computing device 104.

In turn, computing device 104 may generate emotional response profiles of the viewers for the video items, and send the emotional response profiles via a network 110 to a server computing device 120. The emotional response profile comprises a temporal record of the viewer's emotional response to the video item being displayed in the video viewing environment. Put another way, the viewer's emotional response profile for the video item represents that viewer's emotional expressions and behavioral displays as a function of a time position within the video item.

Server computing device 120 may be configured to, for each of the video items, synthesize the emotional response profiles from a plurality of viewers into an aggregated emotional response profile for that video item. Later, a particular video item may be selected for inclusion in a list of selected video items to be displayed to a viewer requesting a video stream. Selection of the particular video item may be based on the identity of the requesting viewer and the requesting viewer's viewing interests as included in a viewing interest profile.

The viewing interest profile for a requesting viewer and/or for a person or people in a group of potentially positively correlated viewers (e.g. that may be likely to respond to a video item in a similar manner as a requesting viewer as determined by a common interest, social commonality, relationship, or other link between the viewers) may then be used to select video items for inclusion in the video stream that may be of potentially greater interest to the requesting viewer. For example, a particular video item may be selected based on an intensity or magnitude of an emotional response of the plurality of viewers whose responses are included in the aggregated emotional response profile to the video item, and/or to aspects of portions of the video item (e.g. objects, scenes, etc. in the video item).

Further, a video item may be selected based on a current emotional status of the requesting viewer. By tailoring video item selection to the requesting viewer, it may be comparatively more likely that the requesting viewer will find the video stream interesting and emotionally stimulating, which may enhance the effectiveness of the entertainment experience and/or help the requesting viewer discover new video content.

Video viewing environment sensor system 106 may include any suitable sensors, including but not limited to one or more image sensors, depth sensors (such as a structured light, time of flight, or stereo depth camera), and/or microphones or other acoustic sensors. Data from such sensors may be used by media computing device 104 to detect postures and gestures of a viewer, which may be correlated by media computing device 104 to human affect displays. It will be understood that the term "human affect displays" as used herein may represent any detectable human response to content being viewed, including but not limited to human emotional expressions and/or detectable displays of human emotional behaviors, such as facial, gestural, and vocal displays, whether performed consciously or subconsciously.

As a more specific example, image data received from viewing environment sensor system 106 may capture conscious displays of human emotional behavior of a viewer, such as an image of a viewer 101 cringing or covering his face. In response, the viewer's emotional response profile for that video item may indicate that the viewer was scared at that time during the video item. The image data may also include subconscious displays of human emotional states. In such a scenario, image data may show that a user was looking away from the display at a particular time during a video item. In response, the viewer's emotional response profile for that video item may indicate that she was bored or distracted at that time. Eye-tracking, facial posture characterization and other suitable techniques may also be employed to gauge a viewer's degree of emotional stimulation and engagement with video item 102.

In some embodiments, an image sensor may collect light within a spectral region that is diagnostic of human physiological conditions. For example, infrared light may be used to approximate blood oxygen levels and/or heart rate levels within the body. In turn, such levels may be used to estimate the person's emotional stimulation.

Further, in some embodiments, sensors that reside in other devices than viewing environment sensor system 106 may be used to provide input to media computing device 104. For example, in some embodiments, an accelerometer included in a mobile computing device (e.g., mobile phones and laptop and tablet computers, etc.) held by a viewer 101 within video viewing environment 100 may detect gesture-based emotional expressions for that viewer.

Figure 2A:
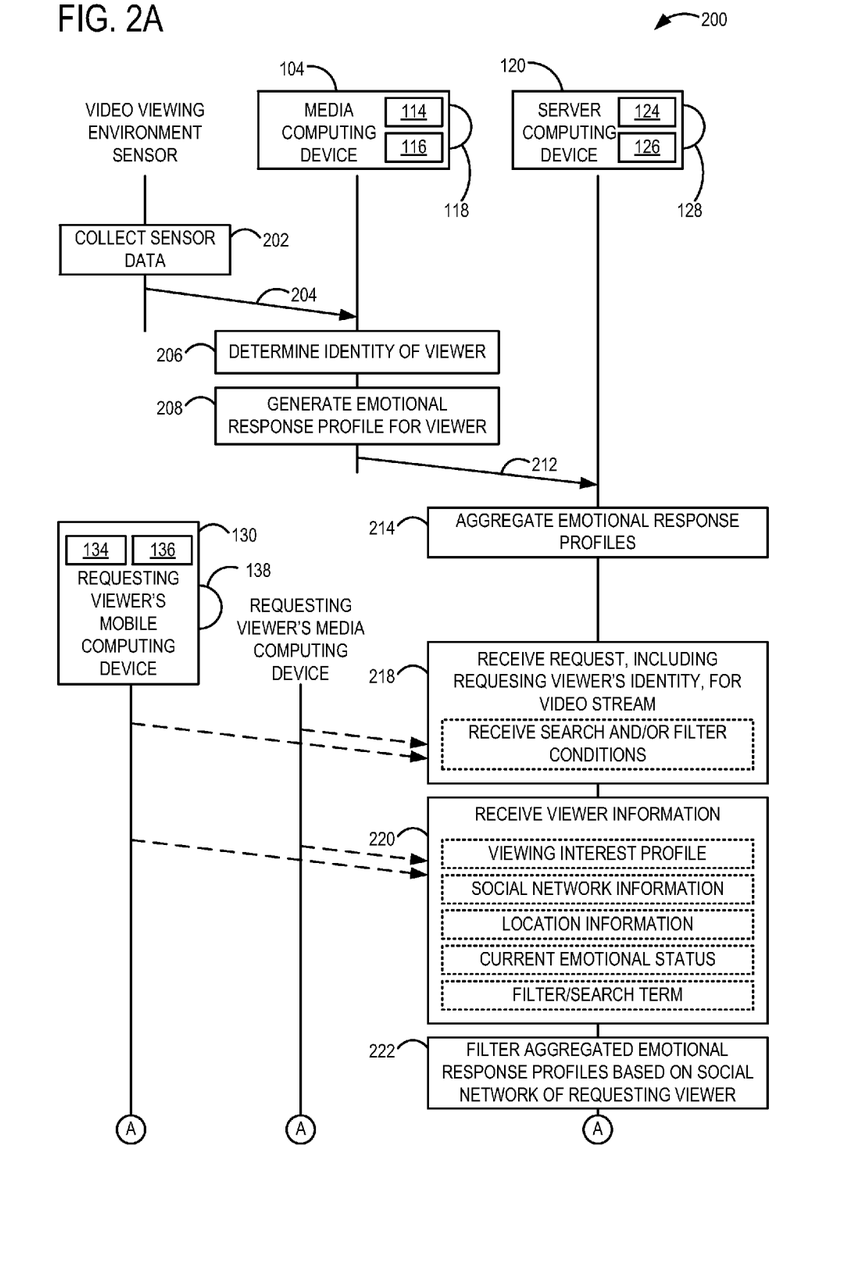
FIGS. 2A-B show a flow diagram depicting a method of delivering a video stream to a requesting viewer according to an embodiment of the present disclosure.
Figure 2B:
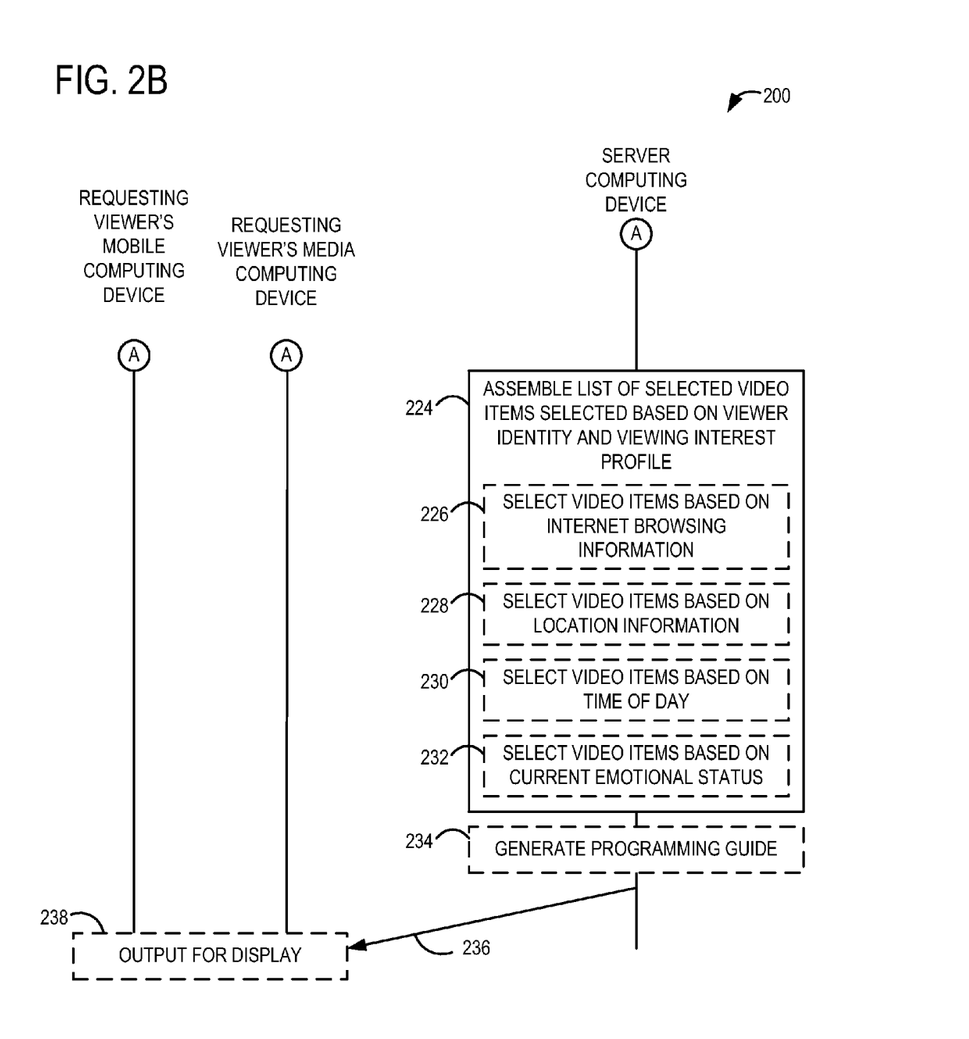

FIGS. 2A-B show a flow diagram depicting an embodiment of a method 200 for delivering a video stream to a requesting viewer. It will be appreciated that method 200 may be performed by any suitable hardware, including but not limited that referenced in FIG. 1 and elsewhere within this disclosure.

As shown in FIG. 2A, media computing device 104 includes a data-holding subsystem 114 that holds instructions executable by a logic subsystem 116 to perform the embodiments disclosed herein. Computing device 104 also may include removable and/or non-removable computer storage media 118 that stores executable instructions. Similarly, the embodiment of server computing device 120 is depicted as including a data-holding subsystem 124, a logic subsystem 126, and removable and/or non-removable computer storage media 128.

As mentioned above, in some embodiments, sensor data from sensors on a viewer's mobile device may be provided to the media computing device. Further, supplemental/related video content related to a video item being watched may be provided to the requesting viewer's mobile computing device 130. Thus, mobile computing device 130 may be registered with and connected to with media computing device 104 and/or server computing device 120 to assist with performing such functions. As shown in FIG. 2A, mobile computing device 130 includes a data-holding subsystem 134, a logic subsystem 136, and removable and/or non-removable computer storage media 138. Aspects of such data-holding subsystems, logic subsystems, and removable computer storage media as referenced herein are described in more detail below.

Returning to FIG. 2A, at 202, method 200 includes collecting sensor data at the video viewing environment sensor and potentially from mobile computing device 130. Then, at 204, method 200 comprises sending the sensor data to the media computing device, which receives the input of sensor data. Any suitable sensor data may be collected, including but not limited to image sensor data, depth sensor data, acoustic sensor data, biometric sensor data, etc.

At 206, method 200 includes determining an identity of a viewer in the video viewing environment from the input of sensor data. In some embodiments, the viewer's identity may be established from a comparison of image data collected by the sensor data with image data stored in the viewer's personal profile. For example, a facial similarity comparison between a face included in image data collected from the video viewing environment and an image stored in the viewer's profile may be used to establish the identity of that viewer. A viewers' identity also may be determined from acoustic data (e.g. by voice recognition), or any other suitable data. Likewise, a viewer identity may be entered manually by a user (e.g. by voice, text entry device, etc.).

Figure 3:
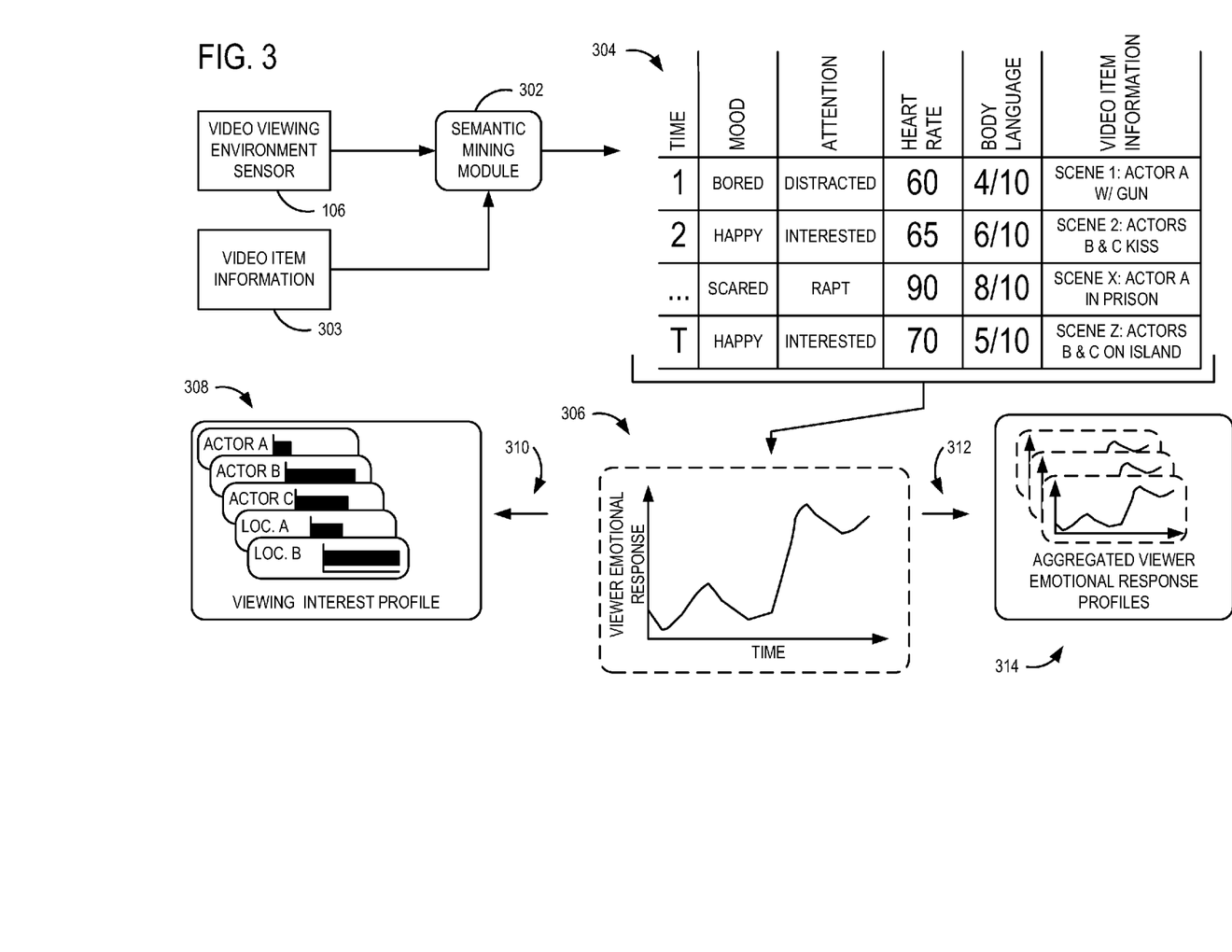
FIG. 3 schematically shows a viewer emotional response profile, a viewing interest profile, and an aggregated viewer emotional response profile according to an embodiment of the present disclosure.

At 208, method 200 includes generating an emotional response profile for the viewer, the emotional response profile comprising a temporal record of the viewer's emotional response to the video item being displayed in the video viewing environment. FIG. 3 schematically shows an embodiment of a viewer emotional response profile 304. As shown in FIG. 3, viewer emotional response profile 304 may be generated by a semantic mining module 302 running on one or more of media computing device 104 and server computing device 120 using sensor information received from one or more video viewing environment sensors. Using emotional response data from the sensor and also video item information 303 (e.g., metadata identifying a video item the viewer was watching when the emotional response data was collected and where in the video item the emotional response occurred), semantic mining module 302 generates viewer emotional response profile 304, which captures the viewer's emotional response as a function the time position within the video item.

In the example shown in FIG. 3, semantic mining module 302 assigns emotional identifications to various behavioral and other expression data (e.g., physiological data) detected by the video viewing environment sensors. Semantic mining module 302 also indexes the viewer's emotional expression according to a time sequence synchronized with the video item, for example, by times for various events, scenes, and actions occurring within the video item. In the example shown in FIG. 3, at time index 1 of a video item, semantic mining module 302 records that the viewer was bored and distracted based on physiological data (e.g., heart rate data) and human affect display data (e.g., a body language score). At later time index 2, viewer emotional response profile 304 indicates that the viewer was happy and interested in the video item, while at time index 3 the viewer was scared but her attention was raptly focused on the video item.

In some embodiments, semantic mining module 302 may be configured to distinguish between the viewer's emotional response to a video item and the viewer's general temper. For example, in some embodiments, semantic mining module 302 may ignore (or may report that the viewer is distracted during) those human affective displays detected when the viewer's attention is not focused on the display device. As an example, if the viewer is visibly annoyed because of a loud noise originating external to the video viewing environment, semantic mining module 302 may be configured not to ascribe the detected annoyance with the video item, and may not record the annoyance at that temporal position within the viewer's emotional response profile for the video item. In embodiments in which an image sensor is included as a video viewing environment sensor, suitable eye tracking and/or face position tracking techniques may be employed (potentially in combination with a depth map of the video viewing environment) to determine a degree to which the viewer's attention is focused on the display device and/or the video item. FIG. 3 also shows an emotional response profile 304 for a video item in graphical form at 306 as further illustration. The emotional response profile may be displayed in such form, for example, to an advertiser and/or content creator seeking to understand viewers' reactions to the video item.

A viewer's emotional response profile 304 for a video item may be analyzed to determine the types of scenes/objects/occurrences that evoked positive and negative responses in the viewer. For example, in the example shown in FIG. 3, video item information, including scene descriptions, are correlated with sensor data and the viewer's emotional responses. The results of such analysis may then be collected in a viewing interest profile 308.

Viewing interest profile 308 catalogs a viewer's likes and dislikes for video items, as judged from the viewer's emotional responses to past media experiences. Viewing interest profiles may be generated from a plurality of emotional response profiles, wherein objects, settings and other images depicted in the video item are linked to detected emotional states. Put another way, the viewer's emotional response profile for a particular video item organizes that viewer's emotional expressions and behavioral displays as a function of a time position within that video item. By performing such analysis for other video items watched by the viewer, as shown at 310 of FIG. 3, and then determining similarities between portions of different video items that evoked similar emotional responses, potential likes and dislikes of a viewer may be determined and then used to locate video item suggestions for future viewing. As the viewer watches more video items, the viewer's viewing interest profile may be altered to reflect changing tastes and interests of the viewer as expressed in the viewer's emotional responses to recently viewed video items. In some embodiments, the viewer's viewing interest profile may also include information about the viewer's personal interests (e.g., hobbies) and/or varying degrees of demographic information for the viewer (e.g., age, gender, location, occupation, etc.).

Turning back to FIG. 2A, the emotional responses of a plurality of viewers to a plurality of video items are received at 212 for further processing. These emotional responses may be received at different times (for example, in the case of video items viewed by different viewers at different times) or concurrently (for example, in the case of a video item viewed by many viewers as a live event). Once received, the emotional responses may be analyzed in real time and/or stored for later analysis, as described below.

At 214, method 200 includes aggregating a plurality of emotional response profiles for the video item to form an aggregated emotional response profiles for those video items. For example, FIG. 3 shows an embodiment of an aggregated emotional response profile 314 for a video item. As shown in 312 of FIG. 3, a plurality of emotional response profiles for a video item, each profile originating from a different viewer, may be averaged or otherwise combined to generate aggregated emotional response profile 314. Additionally, in some embodiments, aggregated emotional response profile 314 may also be associated with video item information in any suitable way (e.g., by director, actor, and location; by genre, theme, style, and length; etc.) to identify characteristics about the video item that triggered, to varying degrees and enjoyment levels, emotional experiences for the plurality of viewers.

Further, in some embodiments, aggregated emotional response profile 314 may be presented graphically (e.g., as a histogram or as a heatmap) depicting the relative degree and/or type of emotional stimulation as a function of time position within the video item. Such graphical depictions may help video content creators identify emotionally stimulating and/or interesting portions of a video item for a group of viewers at any suitable level of granularity (e.g., by filtering the emotional responses by social, demographic, and other suitable criteria). In this manner, emotional responses for a broad group of viewers to a video item may be sorted and filtered to identify emotionally significant aspects of the video item for narrower sub-groups of viewers. Such a graphical depiction, potentially filtered based upon a sub-group of viewers such as a social network, also may be presented to a viewer to help the viewer discover interesting portions of a video content item.

Continuing with FIG. 2A, at 218, method 200 includes receiving a request for a video stream from a requesting device, the request including the requesting viewer's identity. For example, the request may be made when the requesting viewer's mobile or media computing device is turned on or by input from the requesting viewer to a mobile, media, or other computing device. The requesting viewer's identity may be received in any suitable way (for example, the identity may be received as a user ID for the requesting viewer). It will also be appreciated that the request may include image and/or sound data that is able to be matched to a requesting viewer's identity stored in a database, so that, upon matching the image and/or sound data, the identity may be established.

Identifying the requesting viewer may assist with video item selection. For example, the viewing interest profile for the requesting viewer may be associated with the requesting viewer's identity, so that the various interests and preferences of the requesting viewer may be accessed upon identification of the requesting viewer. In some embodiments, the viewing interest profile may be obtained, based on the requesting viewer's identity, from a user account for the requesting viewer upon receipt of the request for the video stream. User accounts may be stored on any suitable computing device (e.g., a server computing device) or in a cloud computing environment so that a requesting viewer may access a personal user account from any number of locations.

It will be appreciated that the requesting viewer's identity may be determined in any suitable way, including but not limited to the viewer identity determination schemes mentioned above. Thus, in embodiments where a viewer is identified via image data, a viewer may simply enter and sit down (or take another position) in a viewing environment within the field of view of the image sensor, be recognized, and start watching a personalized video stream. Similarly simple scenarios may be enjoyed with other viewer identification methods.

In some embodiments, the request for the video stream may include a search term and/or a filter condition provided by the requesting viewer, so that selection of the first portion of the video content may be based in part on the search term and/or filter condition. However, it will be appreciated that a requesting viewer may supply such search terms and/or filter conditions at any suitable point within the process without departing from the scope of the present disclosure.

At 220, method 200 includes receiving information about the requesting viewer. For example, one or more of the requesting viewer's viewing interest profile, social network information, location information, current emotional status, and a requesting viewer-provided filter and/or search term may be received at 220. As explained in more detail below, such information about the requesting viewer may be used to filter the aggregated emotional response profiles and/or select video items for inclusion in the video stream and potentially enhance the personalization of the video stream.

Filtering the aggregated emotional response profiles may identify a subset of those profiles subsequently used when selecting video items for display to the requesting viewer. As a consequence, the more related the group of other viewers is with the requesting viewer, the more interesting and relevant the video items may be to the requesting viewer.

In some embodiments, the aggregated emotional response profiles may be filtered with respect to people in a group of potentially positively correlated viewers, such as members of the requesting viewer's social network. Video items that are deemed interesting to and/or are recommended by members of the requesting viewer's social network may also be more likely to be interesting and relevant to the requesting viewer. Filtering the aggregated emotional responses to various video items by a group of people that are associated socially with the requesting viewer therefore may help to identify video items the requesting viewer might enjoy seeing. As such, method 200 includes, at 222, filtering the aggregated emotional response profiles based on a social network of the requesting viewer.

It will be appreciated that a social network may be any collection of people with a social link to the requesting viewer such that the requesting viewer's interests may be potentially positively correlated with the collective interest of the network members. Such a network may be user-defined or otherwise defined by a common characteristic between users (e.g., alumni relationships). Additionally or alternatively, it will be appreciated that other suitable filters may be employed without departing from the scope of the present disclosure. For example, the aggregated emotional response profiles may be filtered based on demographic characteristics that may lead to more highly correlated interests between demographic group members than between all viewers.

Turning to FIG. 2B, at 228, method 200 includes assembling a list of selected video items based on the requesting viewer's identity and/or viewing interest profile. The requesting viewer's viewing interest profile may be used to identify specific video items and aspects of those video items in which the requesting viewer is interested. For example, FIG. 3 shows that the requesting viewer prefers Actor B to Actors A and C and prefers location type B over location type A. Based on this example, video items including Actor B and/or location type B may be preferentially selected for inclusion in the list.

In some embodiments, video item selection decisions may be made based on a magnitude of an emotional response of the aggregated emotional response profiles for a plurality of video items. If the emotional response magnitude exceeds a preselected threshold, the video item may be deemed as being recommended for the requesting viewer and selected for inclusion in the list. For example, if the requesting viewer's viewing interest profile indicates that the requesting viewer likes a particular television show, an episode of that show that resulted in an emotional response that meets a preselected condition compared to a threshold within the aggregate audience (whether filtered or unfiltered) may be included in the list. Further, in some embodiments, another video item may be included in the list based on an intersection of viewing interest profiles of viewers in the aggregated audience (again, whether filtered or unfiltered) that liked that episode with the viewing interest profile of the requesting viewer.

Additionally or alternatively, video item selection decisions may be made based on aspects of such video items (e.g., themes, actors, locations, concepts, etc.) that are associated with relatively higher magnitudes of emotional responses. For example, if the requesting viewer's viewing interest profile indicates that the requesting viewer is interested in animated movies and the like, and if aggregated emotional response profiles for a group of viewers is relatively higher for a graphically-intense animated television series, then an episode of that television series may be selected for inclusion in the list.

In some embodiments, video items may be selected for inclusion in the list based on the requesting viewer's interests as gathered from information about the requesting viewer included in the requesting viewer's Internet browsing preferences. In such embodiments, 224 may include, at 226, selecting video items based on Internet browsing information. In one example, information about websites the requesting viewer has visited (e.g., ski resort websites) may be used to select video items related to skiing (e.g., an action skiing film). In another example, viewing history information obtained from on-demand video streaming websites may be used to select video items related to video content the requesting viewer watched at such websites.

In some embodiments, video items may be selected for inclusion in the list based on geographic location information, which may be any suitable location information provided by or related to the requesting viewer. In such embodiments, 224 may include at, 228, selecting video items based on location information. In some of these embodiments, the requesting viewer may select one or more geographic locations so that, even when the requesting viewer is not at one of those locations, the requesting viewer may obtain video items (such as news broadcasts, weather information, etc.) that are relevant to those locations. For example, the requesting viewer may select her hometown as a location for which she would like to obtain some video items. In this example, she may be provided with an evening news broadcast from her hometown even when she has travelled to another location.

In some embodiments, video items may be selected based on a time at which the requesting viewer requests the video stream. In such embodiments, 224 may include, at 230, selecting video items based on the time of day. By selecting video items for inclusion based on the time of day, live video items and/or prerecorded video items broadcast according to a preset schedule (e.g., a local, regional, or national broadcast schedule) may be included in the video stream even if other video items in the video stream are prerecorded (and are not broadcast according to a preset schedule). For example, a video stream may be programmed first based on those video items that have preset broadcast times and then gaps in the stream may be filled with prerecorded, unscheduled video items. In this way, a requesting viewer may watch a live event he is interested in viewing, a scheduled broadcast show he watches every week, and reruns of episodes of a favorite show from his childhood, potentially without ever having to select a different video stream.

In some embodiments, the requesting viewer's current emotional state may be used when selecting video items for inclusion in the video stream. In such embodiments, 224 may include, at 232, selecting video items based on the current emotional status of the requesting viewer. By seeking positive correlations between the requesting viewer's current emotional status with and aggregated emotional response profiles for various video items, video items may be selected that complement the requesting viewer's current mood, potentially leading the requesting viewer to engage with and respond to the selected video items. In such embodiments, it will be appreciated that the requesting viewer's emotional status may be obtained in any suitable way, including (but not limited to) the semantic mining techniques described herein.

In some embodiments where selection decisions are based on the requesting viewer's emotional status, the selection of one or more video items may be based on the existence and/or magnitude of a positive correlation between the emotional status of the requesting viewer and an emotional response within the aggregated emotional response profiles for the plurality of video items. For example, if the requesting viewer has a lively emotional state, a video item having an aggregated emotional response profile including a predetermined number or duration of scenes for which the aggregated audience's emotional response exceeding a preselected magnitude of liveliness may be selected for inclusion in the list.

In some embodiments, the video items selected for inclusion in the list may be filtered using a filter applied by the requesting viewer. Further, in some embodiments, some video items may be added to the list responsive to search terms provided by the requesting viewer. Thus, it will be appreciated that the list may be modified in any suitable way according to the preferences of the requesting viewer.

Once assembled, the list may be formed into one or more video streams provided to the requesting viewer. Because the various video items may include live event, broadcast, and/or prerecorded video items, it will be appreciated that a plurality of video streams may be provided concurrently, where some of the video items are scheduled for display according to a live event schedule and/or a broadcast schedule. In such embodiments, a programming guide for the various video streams may be provided to the viewer to help the requesting viewer decide what to watch as it is displayed and/or what to select for recording (e.g., to a DVR device) for playback at a later time. In some embodiments, therefore, method 200 may include, at 234, generating a programming guide for one or more of the video streams.

At 236, method 200 includes sending the video stream for display, the video stream including one or more of the selected video items. In embodiments where a programming guide is generated, sending the video stream may include sending the programming guide. Further, because some requesting viewers may watch a video stream on a primary display while choosing to supplemental content on a mobile computing device, in some embodiments, 236 may include sending supplementary content related to the video stream to a mobile computing device belonging to the requesting viewer. Suitable supplemental content may include (but is not limited to) websites related to the video item being displayed on the primary display, related advertisements, related games and/or fan participation opportunities, and related chat and message interfaces.

At 238, method 200 includes outputting the video stream for display at a suitable display device, such as a display device connected with one or more of a media computing device and/or a mobile computing device. In embodiments where supplemental content is sent, 238 may include outputting the supplemental content for display. Likewise, in embodiments where a programming guide is generated, 238 may include outputting the programming guide for display. For example, FIG. 1 shows a programming guide 170 displayed on mobile computing device 130.

In some embodiments, the methods and processes described in this disclosure may be tied to a computing system including one or more computers. In particular, the methods and processes described herein may be implemented as a computer application, computer service, computer API, computer library, and/or other computer program product.

FIG. 2A schematically shows, in simplified form, a non-limiting computing system that may perform one or more of the above described methods and processes. It is to be understood that virtually any computer architecture may be used without departing from the scope of this disclosure. In different embodiments, the computing system may take the form of a mainframe computer, server computer, desktop computer, laptop computer, tablet computer, home entertainment computer, network computing device, mobile computing device, mobile communication device, gaming device, etc.

The computing system includes a logic subsystem (for example, logic subsystem 116 of mobile computing device 104 of FIG. 2A, logic subsystem 136 of mobile computing device 130 of FIG. 2A, and logic subsystem 126 of server computing device 120 of FIG. 2A) and a data-holding subsystem (for example, data-holding subsystem 114 of mobile computing device 104 of FIG. 2A, data-holding subsystem 134 of mobile computing device 130 of FIG. 2A, and data-holding subsystem 124 of server computing device 120 of FIG. 2A). The computing system may optionally include a display subsystem, communication subsystem, and/or other components not shown in FIG. 2A. The computing system may also optionally include user input devices such as keyboards, mice, game controllers, cameras, microphones, and/or touch screens, for example.

The logic subsystem may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

The data-holding subsystem may include one or more physical, non-transitory, devices configured to hold data and/or instructions executable by the logic subsystem to implement the herein described methods and processes. When such methods and processes are implemented, the state of the data-holding subsystem may be transformed (e.g., to hold different data).

The data-holding subsystem may include removable media and/or built-in devices. The data-holding subsystem may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. The data-holding subsystem may include devices with one or more of the following characteristics: volatile, nonvolatile, dynamic, static, read/write, read-only, random access, sequential access, location addressable, file addressable, and content addressable. In some embodiments, the logic subsystem and the data-holding subsystem may be integrated into one or more common devices, such as an application specific integrated circuit or a system on a chip.

FIG. 2A also shows an aspect of the data-holding subsystem in the form of removable computer storage media (for example, removable computer storage media 118 of mobile computing device 104 of FIG. 2A, removable computer storage media 138 of mobile computing device 130 of FIG. 2A, and removable computer storage media 128 of server computing device 120 of FIG. 2A), which may be used to store and/or transfer data and/or instructions executable to implement the herein described methods and processes. Removable computer storage media may take the form of CDs, DVDs, HD-DVDs, Blu-Ray Discs, EEPROMs, and/or floppy disks, among others.

It is to be appreciated that the data-holding subsystem includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module," "program," and "engine" may be used to describe an aspect of the computing system that is implemented to perform one or more particular functions. In some cases, such a module, program, or engine may be instantiated via the logic subsystem executing instructions held by the data-holding subsystem. It is to be understood that different modules, programs, and/or engines may be instantiated from the same application, service, code block, object, library, routine, API, function, etc Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

It is to be appreciated that a "service", as used herein, may be an application program executable across multiple user sessions and available to one or more system components, programs, and/or other services. In some implementations, a service may run on a server responsive to a request from a client.

When included, a display subsystem may be used to present a visual representation of data held by the data-holding subsystem. As the herein described methods and processes change the data held by the data-holding subsystem, and thus transform the state of the data-holding subsystem, the state of display subsystem may likewise be transformed to visually represent changes in the underlying data. The display subsystem may include one or more display devices utilizing virtually any type of technology. Such display devices may be combined with the logic subsystem and/or the data-holding subsystem in a shared enclosure, or such display devices may be peripheral display devices.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a computing device, a method of delivering video content to a requesting viewer, the method comprising:
for each of a plurality of video content items, aggregating a plurality of emotional response profiles, each emotional response profile comprising a temporal record of a prior viewer's emotional response to a particular video content item when viewed by the prior viewer, to form aggregated emotional response profiles for each of the plurality of video content items;
receiving a request for a video stream from a requesting device, the request including the requesting viewer's identity;

assembling a list of selected video content items for display to the requesting viewer, the selected video items being selected from the plurality of video content items based on the identity of the requesting viewer and a comparison of at least a portion of the aggregated emotional response profile for each selected video item with a threshold, wherein assembling the list of selected video content items comprises selecting an episode of a show having an aggregated emotional response magnitude that exceeds the threshold and not selecting an episode of the show having an aggregated emotional response magnitude that does not exceed the threshold; and sending the video stream including one or more of the selected video content items for display.

2. The method of claim 1, wherein the selected video content items are further selected based on a viewing interest profile comprising the requesting viewer's viewing interests, and further comprising obtaining the viewing interest profile for the requesting viewer from a user account for the requesting viewer based on the requesting viewer's identity.

3. The method of claim 2, wherein the requesting viewer's identity is obtained based upon an image of the requesting viewer collected by an image sensor in a video viewing environment where the video stream is sent for display.

4. The method of claim 1, wherein assembling the list of selected video content items comprises selecting the selected video content items based on an emotional status of the requesting viewer received with the request for the video stream.

5. The method of claim 4, wherein assembling the list of selected video items includes selecting one or more of the selected video content items based on a positive correlation between the emotional status of the requesting viewer and an emotional response within the aggregated emotional response profiles for the plurality of video content items.

6. The method of claim 5, further comprising filtering the aggregated emotional response profiles based on a social network to which the requesting viewer belongs.

7. The method of claim 1, wherein assembling the list of selected video content items includes selecting the selected video content items based on a time of day.

8. The method of claim 1, further comprising sending supplementary content related to the video stream to a mobile computing device belonging to the requesting viewer.

9. A media presentation system, comprising:
a peripheral input configured to receive image data from a depth camera;
a display output configured to output video content to a display device;
a logic subsystem; and
a data-holding subsystem holding instructions executable by the logic subsystem to:
collect image data capturing a requesting viewer;
based upon the image data, obtain an identity of the requesting viewer;
send a request for a video stream assembled from selected video items based on the identity of the requesting viewer;
receive the video stream, the video stream comprising one or more video content items each having an aggregated emotional response profile with at least a portion having a magnitude that exceeds a preselected threshold;
output the video stream to the display output;
receive a request to present a graphical representation of a specified aggregated emotional response profile that illustrates emotional response data as a function of time position; and
output the graphical representation of the specified aggregated emotional response profile to the display output.

10. The system of claim 9, further comprising instructions to detect one or more of an emotional status of the requesting viewer and the identity of the requesting viewer using the image data, wherein the request includes the one or more of the emotional status and the identity of the requesting viewer.

11. The system of claim 9, further comprising instructions to register a mobile computing device belonging to the requesting viewer with the media presentation system and to deliver supplementary content related to the video stream to the mobile computing device.

12. A computing system for delivering a video stream to a requesting viewer in a video viewing environment, comprising:
a logic subsystem; and
a data-holding subsystem holding instructions executable by the logic subsystem to:
obtain, for each video item of a plurality of video items, an aggregated emotional response profile, each aggregated emotional response profile representing an aggregate of a plurality of emotional response profiles, each emotional response profile comprising a temporal record of a prior viewer's emotional response to a particular video item;
receive an identity of the requesting viewer, the identity being determined from image data obtained from a video viewing environment sensor in the video viewing environment;
receive a current emotional status of the requesting viewer, the current emotional status being determined from the image data;
select video items for inclusion in a list of selected video items based on the identity of the requesting viewer, a viewing interest profile comprising the requesting viewer's viewing interests, the current emotional status of the requesting viewer, and a comparison of at least a portion of the aggregated emotional response profile for each selected video item with a threshold, wherein assembling the list of selected video items comprises selecting an episode of a show having an aggregated emotional response magnitude that exceeds the threshold and not selecting an episode of the show having an aggregated emotional response magnitude that does not exceed the threshold; and
send for display a video stream including one or more of the selected video items.

13. The computing system of claim 12, further comprising instructions to:
aggregate the plurality of emotional response profiles for each of the plurality of video items;
wherein the instructions to assemble the list of selected video items further comprise instructions to select the selected video items based on a positive correlation between the current emotional status of the requesting viewer and an emotional response within the aggregated emotional response profiles for the plurality of video items.

14. The computing system of claim 13, further comprising instructions to filter the aggregated emotional response profiles based on a social network to which the requesting viewer belongs.

15. The computing system of claim 12, further comprising instructions to:
   receive one of location information and Internet browsing information from a mobile computing device belonging to the requesting viewer, and
   wherein the instructions to assemble the list of selected video items includes instructions to select the selected video items based on the one of location information and Internet browsing information.

16. The computing system of claim 12, wherein the instructions to assemble the list of selected video items further comprise instructions to select the selected video items based on a time of day.

17. The computing system of claim 12, further comprising instructions to send supplementary content related to the video stream to a mobile computing device belonging to the requesting viewer.

18. The computing system of claim 12, further comprising instructions to generate a programming guide for the video stream populated with information about the selected video items and send the programming guide for display.

\* \* \* \* \*